June 24, 1924.

M. E. BUHSE ET AL

ICE CREAM CONE COATING DEVICE

Filed July 24, 1922

1,499,149

Inventors
Maximilian E. Buhse
Walter W. Buhse
By their Attorneys
Merchant & Kleyn Patented June 24, 1924.

1,499,149

UNITED STATES PATENT OFFICE.

MAXIMILIAN E. BUHSE AND WALTER W. BUHSE, OF MINNEAPOLIS, MINNESOTA.

ICE-CREAM-CONE-COATING DEVICE.

Application filed July 24, 1922. Serial No. 577,028.

*To all whom it may concern:*

Be it known that we, MAXIMILIAN E. BUHSE and WALTER W. BUHSE, citizens of the United States, residing at Minneapolis, in the county of Hennepin and State of Minnesota, have invented certain new and useful Improvements in Ice-Cream-Cone-Coating Devices; and we do hereby declare the following to be a full, clear, and exact description of the invention, such as will enable others skilled in the art to which it appertains to make and use the same.

Our present invention provides an extremely simple and highly efficient device for applying fluid confection coatings to shell-like pastry and has been especially designed for use in applying chocolate coatings to the interiors of ice-cream cones.

The chocolate which is to form the coating and which is usually mixed with a small amount of cocoa butter, is kept in proper fluid condition by artificial heat. In the preferred form of our improved device or apparatus, the chocolate is placed in a vat, the vat is partly immersed in water contained in a water tank, and the water in said tank is kept at the proper degree of temperature by a small electric heater or suitable source of heat.

Immersed within the liquid chocolate or coating material and contained within the vat is a pump, a fountain of novel construction connected to the pump, and certain other important novel features, all of which will be hereinafter described and defined in the claims.

In the accompanying drawings, which illustrate the invention, like characters indicate like parts throughout the several views.

Referring to the drawings.

Figure 1:
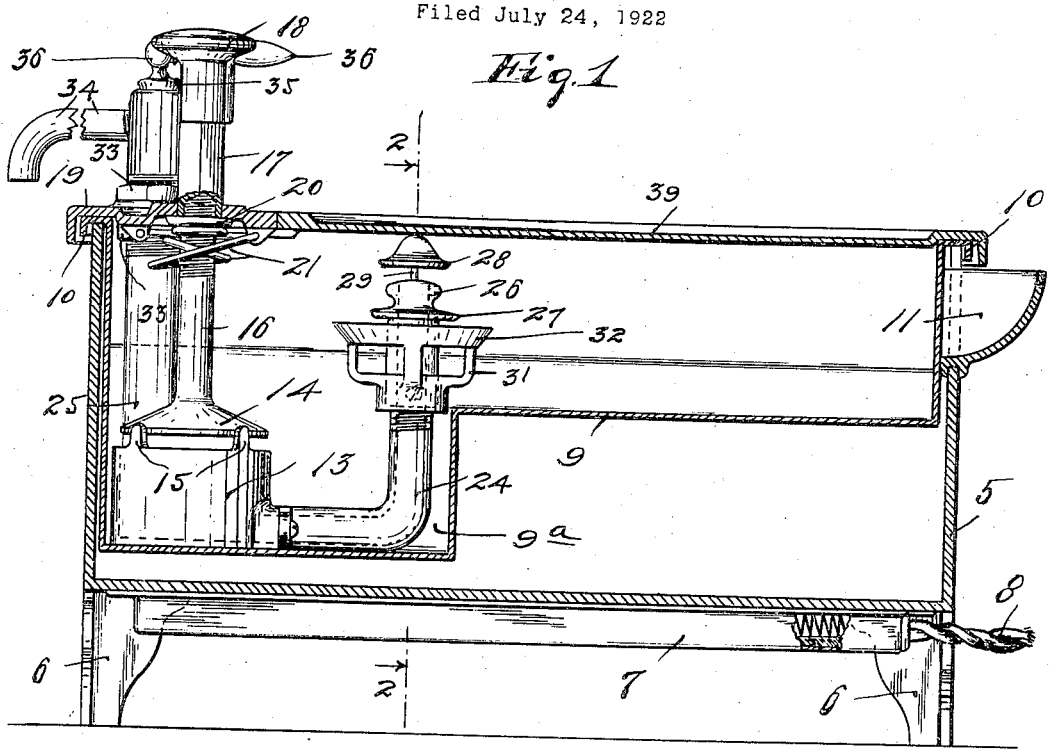
Fig. 1 is a vertical longitudinal section taken centrally through the complete device, some parts being shown in full.

The tank in which the hot water is maintained is preferably a rectangular cast metal structure 5 having short supporting legs 6 and provided on its bottom with an electric heater 7 connected in a supply circuit 8.

The vat 9, for containing the chocolate or coating material $y$, fits within the tank 5 and is provided with an outstanding flange 10 that rests on the upper edge of the latter. The lower portion of the vat 9 is transversely contracted and a portion thereof is raised above a pump-receding space $9^a$ of said vat. At one end, the tank 5 is shown as provided with a funnel-like filling neck 11 through which water may be poured to maintain the level of the water in the tank so that the vat will be properly immersed therein. The electric heater 7 comprises a drawer-like metal casing with outstanding flanges working slidably in guide clips 12 on the bottom of the water tank so that said electric heater can be readily removed from and applied to the tank.

The pump for forcing the liquid coating out of the vat comprises a short cylinder 13 and a dasher-acting piston 14. The cylinder 13 is secured on the bottom of the vat in the depressed space $9^a$ and has upstanding circumferentially spaced guide lugs 15 that normally hold the piston head 14 aligned with the interior of the cylinder. The piston head 14 has an upwardly projecting stem 16, which, as shown, is threaded at its upper end and adjustably screwed into the stem 17 of an operating knob 18. As shown, the stem 17 is square in cross-section and works through a square hole in a top plate 19 fixed on the top of the vat. On the threaded portion of the stem 16 is a stop collar 20. The numeral 21 indicates a helical coiled spring, the ends of which are anchored to the top plate 19 and the contracted central portion of which surrounds the stem 16 and presses the stop collar 20 upward against the plate 19 and thus normally holds the piston head 14 above the upper edge of the cylinder 13, but not beyond the guide lugs 15, as shown in Fig. 1. In the said position of parts shown in Fig. 1, the liquid chocolate or coating will overflow into and fill the cylinder 13. Near its bottom, the cylinder 13 is provided with two ports 22 and 23 that connect, respectively, to a fountain tube 24 and to a faucet tube 25. The extended portion of the fountain tube 24 is turned vertically outward and is threaded and onto this threaded end is screwed a tubular discharge nozzle 26. This nozzle 26 is formed with an outstanding downwardly oblique annular deflecting flange 27. The numeral 28 indicates a concavo convex substantially conical deflecting cap shown as secured on the upper end of the rod 29 that extends axially downward in the nozzle 26 and has a laterally bent lower end directly secured to said nozzle 26.

Adjustably secured for vertical sliding adjustments on the nozzle 26, by means of a set screw 30, is a collar having outwardly and upwardly extended circumferentially spaced arms 31 that support an upwardly flaring annular cone-centering ring 32, which latter is located concentric to but which is much larger than the deflecting flange 27.

The faucet tube 25 extends vertically upward through the fixed plate 19 and is clamped in position by nuts 33 that work with threaded engagement on said stem and press against the bottom and top of said fixed plate 19. The upper end of the faucet tube 25 is connected to an outwardly extended faucet nozzle 34. At the connection between the faucet tube 25 and nozzle 34, said tube is provided with a two-way valve 35 shown as provided with an operating handle 36. This valve 35 has an axial bore 37 and lateral delivery port 38.

Figure 3:
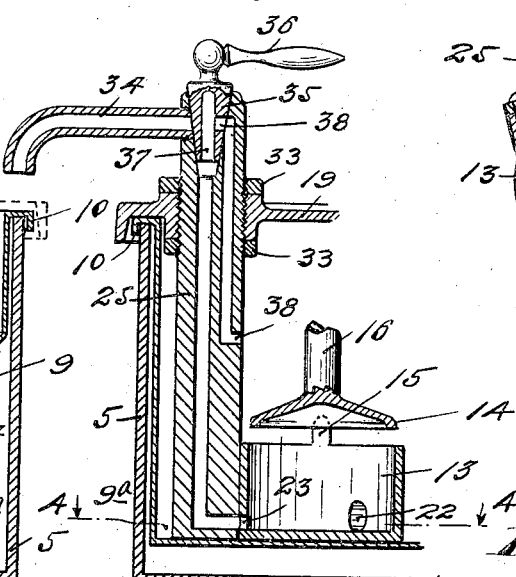
Fig. 3 is a fragmentary vertical section on a larger scale than in the other views, showing the pump and a cooperating discharge faucet.
Figure 4:
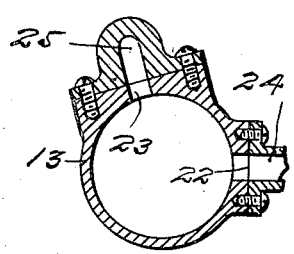
Fig. 4 is a detail in horizontal section on the line 4—4 of Fig. 3.

When the valve 35 is in the position shown in Fig. 3, the interior of the pump cylinder 13 will be cut off from the faucet nozzle 34, but the axial passage of said tube 25 will then be in communication with a return duct 38 formed in said tube. When the valve 35 is turned one hundred and eighty degrees from the position shown in Fig. 3, the return duct 38 will be closed and the interior of the cylinder will be connected to the faucet nozzle 34.

Figure 2:
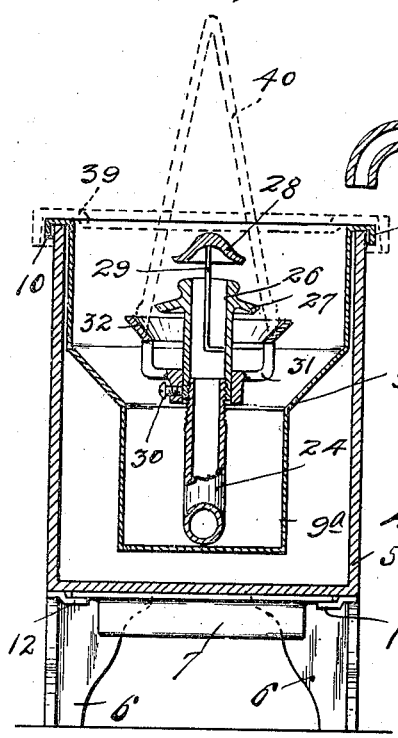
Fig. 2 is a transverse vertical section on the line 2—2 of Fig. 1.

The numeral 39 indicates a removable cover plate which will be applied to the top of the vat and will serve to close the same when the device is out of use. In Fig. 2, an ice-cream cone 40 is indicated by dotted lines.

When the device is to be used, the cover plate 39 will be removed or slid into position to expose the fountain head, but when the device is to be used to internally coat ice-cream cones, the valve 35 should be set in its closed position, shown in Fig. 3, and the cone inverted will be placed over the deflecting cap 28 and the deflecting flange 27, and its lower edge will be placed within the conical centering ring 32. This ring 32 will serve to properly center or align the cone axially with the elements of the fountain head. The centering ring 32 should be vertically adjusted so that there will be the proper slight space between the cone and the edges of the cap 28 and flange 27. Then, when the plunger-acting piston 14 is substantially forced downward by pressing downward on or striking the operating knob 18, there will be a rush of the liquid coating material upward through the fountain tube 24 and against the deflecting cap 28. The coating material dashed against the under surface of the cap 28 will be deflected outward in all directions against the interior of the cone and will be violently caused to rush downward, partly by momentum and partly by gravity and, as it runs over the deflecting flange 27, will be again directed against the inner surface of the cone. The surplus coating material will continue to run down over the inner surface of the cone, coating the same from the points of first application to the lower edge thereof. Of course, the surplus coating material dripping from the cone will run back into the vat. It will thus be seen that the cone will be chocolate coated, not to the complete apex thereof, but from a point quite distant from its apex to the rim of the cone and this is a desired result.

With the valve 36 set as shown in Fig. 3, there will be a slight rush of the warm or hot coating material upward through the faucet tube 25 and back through the return duct 38, each time that there is a discharge through the fountain head, but this does not interfere with the proper action of the fountain and serves to keep the slight passage to the faucet always open and ready for use.

When the valve 36 is turned one hundred and eighty degrees from the position shown in Fig. 3 and the piston of the pump is forced downward as before described, there will be a discharge of the coating material through the faucet nozzle 34, so that a deposit of the liquid chocolate or the like may be delivered onto the ice-cream deposited in the cone or onto a scoop of ice-cream contained in a dish or other container for forming a chocolate sundae.

Of course, each time there is a discharge of the chocolate through the faucet for the purpose just stated, there will also be a discharge through the fountain, but this keeps the fountain conduits open and the discharge would simply drop back into the vat. The amount of the discharge may be varied by the force or extent of the depression of the pump piston. It will be further understood that when the valve 35 is set in a position ninety degrees from the position shown in Fig. 3, both the faucet nozzle 34 and the return duct 38 will be closed and sometimes this will be found desirable.

In actual practice, this device has been found very efficient for the purpose had in view. Vertical adjustments of the cone centering ring 32 make it possible to set the cone so the coating of more or less of the interior thereof will be chocolate.

What we claim is:

1. A device for applying fluid coatings comprising a vat for the coating material, a pump in said vat, and a fountain receiving from said vat and terminating in a fountain head located above the surface of the coating material, said fountain head having a ring concentric therewith but spaced apart therefrom, said ring being provided with a concavely conical cone-centering surface.

2. A device for applying fluid coatings comprising a vat for the coating material, a pump in said vat, and a fountain receiving from said vat and terminating in a fountain head located above the surface of the coating material, said fountain head comprising a conical cone-centering ring having above but concentric therewith a deflecting cap limiting the upward splash of the coating material.

3. The structure defined in claim 2 in further combination with an annular deflecting flange of less diameter than said centering ring and of greater diameter than said deflecting cap and located vertically between said cap and ring.

4. A device for applying fluid coatings comprising a vat for the coating material, a pump in said vat, and a fountain receiving from said vat and terminating in a fountain head located above the surface of the coating material, said fountain head comprising a conical cone-centering ring having above but concentric therewith a deflecting cap limiting the upward splash of the coating material, said centering ring being vertically adjustable.

5. The structure defined in claim 3 in which said centering ring is vertically adjustable in respect to said cap and deflecting flange.

6. A device for applying fluid coating comprising a vat for the coating material, a pump in said vat, and a fountain receiving from said vat and terminating in a fountain head located above the surface of the coating material, said fountain head having a deflecting cap limiting the upward splash of the coating material.

7. The structure defined in claim 3 in which said pump comprises a cylinder submerged in the coating material of said vat, the piston of said cylinder being normally above the upper edge of said cylinder so that the liquid coating material will flow into said cylinder.

8. A device for applying fluid coatings comprising a vat for containing the fluid coating, a pump in said vat and a fountain and a discharge faucet both connected to and receiving from said pump.

9. A device for applying fluid coatings comprising a vat for containing the fluid coating, a pump in said vat, and a fountain and a discharge faucet both connected to and receiving from said pump, said pump comprising a cylinder submerged in the coating material and a piston that is normally above the upper edge of said cylinder so that the coating material will flow into said cylinder.

10. The structure defined in claim 8 in which said faucet comprises a stem equipped with a valve, said stem having a return duct, and a valve, which valve when set in one position will open the faucet for discharge and when set in another position will open the faucet stem to said return duct.

11. The structure defined in claim 6 in which the fountain is further provided with a cone-centering device that is adjustable toward and from the deflecting cap.

In testimony whereof we affix our signatures.

MAXIMILIAN E. BUHSE.
WALTER W. BUHSE.